A. MENDELSON.
DOUBLE PRESSURE SET SCREW.
APPLICATION FILED SEPT. 25, 1914.
1,160,932.
Patented Nov. 16, 1915.
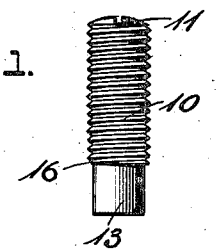
Fig. 1.
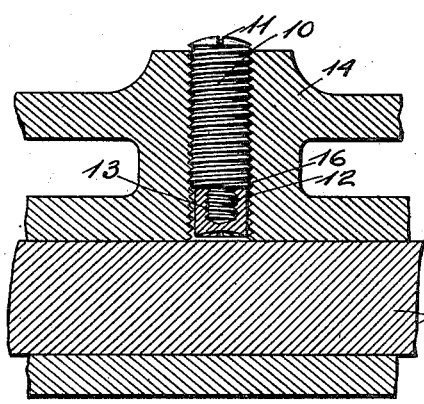
Fig. 2.
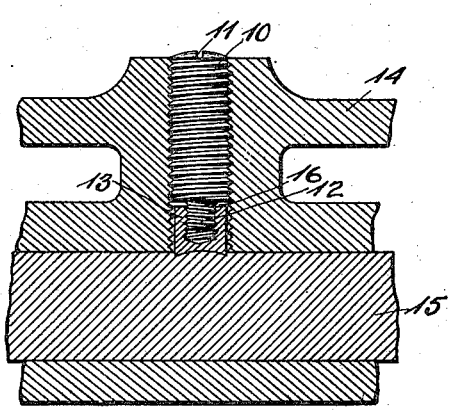
Fig. 3.
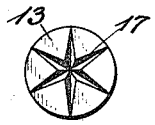
Fig. 4.
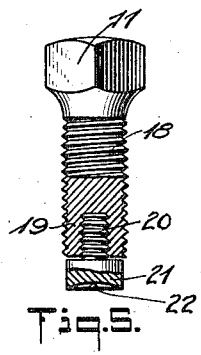
Fig. 5.
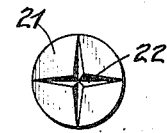
Fig. 6.
WITNESSES
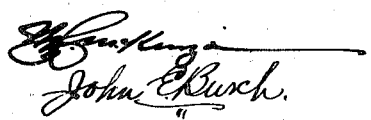
INVENTOR
Aaron Mendelson
BY 
ATTORNEYS

UNITED STATES PATENT OFFICE.

AARON MENDELSON, OF NEW YORK, N. Y.

DOUBLE-PRESSURE SET-SCREW.

1,160,932. Specification of Letters Patent. Patented Nov. 16, 1915.

Application filed September 25, 1914. Serial No. 863,473.

*To all whom it may concern:*

Be it known that I, AARON MENDELSON, a citizen of the United States, and a resident of the city of New York, borough of Brooklyn, in the county of Kings and State of New York, have invented a new and Improved Double-Pressure Set-Screw, of which the following is a full, clear, and exact description.

This invention relates to improvements in set screws and the object thereof is the provision of a screw embodying a shank and a point so connected as to cause a double application of pressure against an object to be held by turning the shank after the point is so engaged with an object as to prevent its rotation, thereby reducing the amount of pressure required to tighten the set screw.

A further object of the invention is to provide a set screw comprising a shank threaded to engage an aperture of a carrying part receiving a member to be held and in which a point is threaded to the shank in an opposite direction to the threading of the shank, whereby rotation of the shank after the point has come in binding engagement with an object, will cause the point to move away from the shank as the shank is screwed home, without causing a binding engagement of the parts with each other, and so that the shank may be made of ordinary machined steel and the engagement member of hardened or tempered steel to cheapen the cost of the set screws but more desirably to obviate the necessity of renewing the entire set screw in the event that the point becomes mutilated or dulled.

Set screws have heretofore been provided in which the shank or threaded part of soft material such as iron or steel was provided with a socket or reduced end, in or to which a point of hardened material was fitted, but when the screw was tightened the point or engaging member would bindingly engage with the shank of the set screw with the result that the hardened point or engaging member would resist greater pressure than the shank and thus result in the mutilation of the shank and invariably at points at or below the upper end of the engaging member or point. The disadvantage of a point of this character is that in order to remove the broken part of the screw it will be necessary to drill into the point which is made harder than the material employed for the ordinary drill and thus it will be almost impossible to replace a set screw. Furthermore, for each degree of pressure exerted against the shaft or element which is held or engaged by the point a corresponding pressure must be exerted in turning the screw, and since it is necessary for the point to turn relatively to the shank this pressure is materially increased by the friction between these parts in order to tighten the set screw, whereas in the present invention the point being held against movement without interfering with the turning of the shank, the engaging member or point may be made cross-shaped, star-shaped, chisel-shaped or any other particular form which will bite into the shaft, or other object or part to be held against movement with respect to a fixed or carrying part, whereby a more positive engagement is effected.

With the above and other objects in view, the invention resides in the peculiar combination and arrangement of parts to be hereinafter more fully described, illustrated and claimed, it being also an object to provide a device which is simple in construction, durable and efficient in operation.

Reference is to be had to the accompanying drawings forming a part of this specification, in which similar characters of reference indicate corresponding parts in all the views, and in which Figure 1 is a side elevation of the preferred form of double pressure set screw constructed in accordance with the invention; Fig. 2 is a sectional view thereof showing the same applied to an object to be held but before being screwed home; Fig. 3 is a similar view showing the device after it has been screwed home or tightened; Fig. 4 is a face view of the engaging end of the point of the set screw; Fig. 5 is a sectional view of a modification of the invention; and Fig. 6 is a face view of a modified form of point or engaging member.

As illustrated in Figs. 1 to 4, inclusive, the preferred embodiment of the invention comprises a set screw in which double pressure is exerted against the shaft or element to be held when the screw is turned, and for this purpose the screw comprises a shank part 10 having a tool engaging end or screw head 11 of the same size or enlarged relatively thereto for the application of a screw driver or wrench in turning the same. The shank is provided with a reduced exteriorly threaded portion or extension 12, the extent of direction of the threads of the reduced portion or extension being opposite to that of the threads of the shank proper and adapted to receive an engaging member or point 13 thereon. This point is interiorly threaded for engagement with the reduced portion or extension 12 but is smooth exteriorly and may be made to fit relatively snugly in the carrying part 14 to which the set screw is applied. This engaging member or point is, however, preferably made slightly smaller than the external diameter of the shank so that it may be readily removed.

In the use of the set screw for engaging an element or part 15 to be held, the engaging member or point is threaded on the extension 12 to contact with a shoulder 16 produced by the reduced extension 12 with the body of the shank or set screw proper so that when the set screw is screwed home and the engaging member or point is in binding contact with the part 15 and the screw is tightened, the point will be held against turning and rotation of the shank will result in the point moving away from the shank due to its threaded engagement therewith, whether the shank is made of reduced size or not, so that the screw may be tightened with a minimum application of pressure and whereby the provision of two sets of threads will distribute the strain thereon and relieve each of a great amount of pressure so as to prevent their mutilation. The engaging end or face of the engaging member or point may be made star-shaped, as shown at 17, or otherwise shaped to efficiently bite into the element engaged thereby.

In the other form of the invention described as a modification the shank 18 is provided with an internally threaded socket 19 receiving an externally threaded reduced portion 20 of the engaging member or point 21. The point is smooth on its lateral surface and is threaded to the shank in a direction opposite to the direction in which the shank engages the carrying part so that the action is the same as just described when tightening the set screw. The engaging face of the point 21 may be made cross-shaped, chisel-shaped or any other particular form, as shown at 22, to positively bite into the object engaged thereby. This form of the invention, however, does not possess the salient advantage existent in the preferred form of the invention, in that, should the shank break in use it would be more likely to break adjacent to the reduced portion 20 so that it would be necessary to drill into this part to remove the surrounding threaded portion of the shank, whereas the shank 10 if broken may be removed without drilling into the engaging member or point at all. Both forms, however, possess the advantage of the double application of pressure heretofore described.

Having thus described my invention, what I claim as new and desire to secure by Letters Patent is:—

1. A double pressure set screw comprising an exteriorly threaded shank and an engaging member or point oppositely threaded to the shank and adapted when held against turning by engagement with an object to be held during the tightening of the set screw by turning the shank, to move away from the shank and in binding contact with the object engaged thereby, the strain being distributed upon the two sets of threads.

2. A double pressure set screw comprising a threaded shank having an engaging end and a point threaded to the shank to unscrew therefrom when the shank is turned and the point is held against rotation, said point being adapted to loosely fit the seat of a carrying part for the set screw and the shank being of softer material than the point.

3. A set screw comprising an external shank having a reduced externally threaded extension, means whereby the shank may be turned and an engaging member having an internally threaded socket engaged on the extension, the direction of extent of the threads of the shank being opposite to that of the threads on the extension to cause said parts to move toward and away from each other when the screw is applied and removed respectively, said engaging member having a biting end.

4. A set screw comprising a pair of sections, one of said sections being adapted for movable engagement with a carrying element and the other section being adapted to clamp an object to be held against movement with respect to said carrying element and coöperative means movably connecting said sections to cause opposite movement and separation thereof when the first named section is moved in operative engagement with the carrying element and the other section is frictionally engaged with an object to be held, said means serving to cause said sections to move in reverse directions when the first named section is oppositely operated.

5. A double pressure set-screw comprising a shank externally threaded to screw into an object, and a point relatively rotatable and united by screw threads with the shank, the threads between the point and shank being of opposite pitch from the pitch of the threads of the shank, said point having its end face shaped to bite into an object, whereby the point is held against rotation while the shank is turned home.

In testimony whereof I have signed my name to this specification in the presence of two subscribing witnesses.

AARON MENDELSON.

Witnesses:
JOHN E. BURCH,
GEORGE H. ENSLEE.